UNITED STATES PATENT OFFICE 2,092,867

MANUFACTURE OF ARYLAMINO-NAPHTHALENE-SULPHONIC ACIDS

Otto Allemann, Wilmington, Del., assignor to E. I. du Pont de Nemours & Company, Wilmington, Del., a corporation of Delaware No Drawing. Application November 26, 1935, Serial No. 51,603

7 Claims. (Cl. 260—129)

This invention relates to the manufacture of arylated naphthylamine-sulphonic-acids. More particularly, it relates to the manufacture of compounds derivable from alpha-naphthylamine-sulphonic-acids by substituting one of the hydrogens in the amino group with an aryl radical of the benzene series.

It is an object of this invention to provide an improved process for manufacturing compounds of the above type. It is a further object to provide a process of the type above mentioned, characterized by high speed of reaction resulting in improved efficiency and economy. It is a further object of this invention to provide a process for manufacturing compounds of the above type wherein the reaction is carried out in a closed vessel, thereby avoiding unnecessary exposure of the reaction product to the air. Other and further important objects of this invention will appear as the description proceeds.

Compounds with which this invention particularly deals are typified by the following individuals: 1-phenyl-amino-naphthalene-8-sulphonic-acid, 1-phenyl-amino-naphthalene-5-sulphonic-acid, 1,3-dianilino-naphthalene-8-sulphonic-acid, 1,3-dianilino-naphthalene-6,8-disulphonic-acid.

It has been the custom to prepare compounds of this type in the art by boiling a mixture of the corresponding naphthylamine-sulphonic-acid with an excess of aniline in an open vessel or in a closed vessel under pressure. The temperature employed generally was of the order of 150 to 225° C. The reaction involved is illustrated by the following equation:

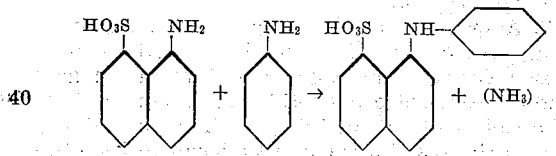

It was found, however, that the reaction generally does not go to completion unless the heating is continued for a very long time. In the average case it would require 30 to 50 hours and in some cases as long as 72 hours.

I have now found that the above reaction is considerably accelerated if the reaction is carried out under a vacuum, for instance at an absolute pressure below 20″ of mercury. The reaction time in such cases is reduced frequently to practically one-half of its previous value. In general, the better the vacuum, the shorter the time of reaction, but it is desirable to have the pressure at least high enough to permit the reaction mass to reach the optimum temperature for reaction. This is generally in the neighborhood of 150 to 175° C. In the average case the pressure may drop as low as 5 to 15″ of mercury absolute without lowering the temperature too much.

That the reaction would be accelerated by the use of a vacuum is quite surprising. It is not a general rule in chemical reactions that the speed of reaction would increase with a reduction of the pressure.

Since reaction is necessarily carried out in a closed vessel, I obtain the incidental advantage that the reaction mass is not exposed to the atmosphere. Diarylamines, especially phenyl-amino-naphthalene-sulphonic-acids are very sensitive to oxidation, particularly at elevated temperatures. In the general practice of the art heretofore, the reaction product was exposed to the oxygen of the air and its quality was considerably impaired. By my improved process above mentioned, I obtain a product of exceptional purity.

Without limiting my invention to any particular details, the following examples are given to illustrate my preferred mode of operation. Parts mentioned are by weight.

Example 1

200 parts of peri acid (1-amino-naphthalene-8-sulphonic acid) are added with agitation to 640 parts of aniline. Under a high vacuum the mass is heated and about 150 parts of a mixture of aniline oil and water is distilled off. By partly releasing the vacuum the temperature of the mass is allowed to rise to 150–155° C. The vacuum is adjusted to cause the mixture to boil in this temperature range (about 9 inches absolute pressure) for eighteen hours. Then as much as possible of the excess and uncombined aniline is so distilled under vacuum that the temperature of the mixture does not exceed 155° C. This requires a gradual increase in the vacuum. 300 parts of water and a slight excess of sodium hydroxide are then added. The resulting solution is then steam distilled to remove the last traces of aniline, and filtered hot to remove any insoluble material. The phenyl peri acid is isolated from this solution in any suitable manner, as for example salting out the phenyl peri acid sodium salt with common salt.

Example 2

A glass flask fitted with an agitator, a reflux condenser, a delivery condenser attached to a receiver and vacuum pump, and heated in an oil bath, was charged with 1350 parts para-phenetidine and 223 parts of peri-acid. The change was heated to boiling under 200 mm. mercury pressure and distilled until all water had been removed. The mass then was heated under reflux at 150° C. and 225 mm. mercury pressure for six hours. By this time the peri-acid has disappeared, indicating complete reaction.

The charge was diluted with water, made alkaline with sodium carbonate, and the para-phenetidine removed by steam-distillation.

The residue after steam-distillation was filtered to remove insoluble matter. The product was precipitated by addition of sodium chloride to the filtrate, and separated by filtration. The p-phenetyl-peri-acid thus obtained in good yield was of excellent quality.

Instead of salting out the reaction product, it may be used in aqueous solution directly as obtained after the steam distillation and removal of insoluble by-products. Alternatively, the product may be precipitated by acidification.

It is remarkable that when the above process is carried out at atmospheric pressure a very low yield of phenetyl-peri-acid is obtained, even if the time of reaction is 48 hours or more.

In a manner similar to the above, various other diarylamines of the above series may be prepared. For instance, in lieu of aniline, one may use substituted anilines, particularly anilines carrying inert substituents, such as halogen, alkyl and alkoxy. As typical examples of these may be mentioned besides aniline: o-, m-, and p-toluidines, the xylidines, o-, m-, and p-anisidines, the respective phenetidines, cresidine, 2:5-diethoxy- or dimethoxy-aniline, chloro-anilines.

Likewise, in lieu of peri acid, other alpha-naphthylamine-sulfonic-acids may be employed, such as: The Cleve's acids (1,6 and 1,7-naphthylamine-sulphonic acids), Laurent's acid, (1,5-naphthylamine-sulphonic acid), Koch acid (1-naphthylamine-3,6,8-trisulphonic acid), amino epsilon acid (1-naphthylamine-3,8-disulphonic acid), Freund's acid (1-naphthylamine-3,6-disulphonic-acid).

In the three acids last mentioned, the sulphonic acid group in the 3-position is replaced by another arylamino radical, resulting in the production of a 1,3-di(arylamino)-naphthalene-sulphonic acid, as illustrated by 1,3-dianilino-naphthalene-8-sulphonic acid.

The proportions of the reactants may vary within wide limits. Since the arylamine of the benzene series is generally the one that is liquid, it is preferred to use an excess of the same to serve as a diluent for the reaction mass.

The temperature of the reaction mass may vary anywhere within the limits employed in the art, but the best results are obtained by operating between 150 and 175° C.

The details of the isolation and recovery may vary within wide limits. The aryl-amino-naphthalene-sulphonic-acid produced may be isolated in the form of free acid, if desired, or in the form of any suitable salt, such as sodium, potassium, ammonium or magnesium. In general, any of the methods of recovery and isolation which are applicable to similar reactions in the art may be employed in my improved process.

While in many instances it is satisfactory to carry out the reactions in vessels constructed of iron or steel, in some instances better results are obtained if the vessels are constructed of lead or the stainless steels, or are lined with silicate enamels.

I claim:

1. In the process of reacting an arylamine of the benzene series with an alpha naphthylamine-sulphonic acid to produce an arylamino-naphthalene sulphonic acid, the improvement which comprises effecting the reaction under an absolute pressure not greater than 20 inches of mercury.

2. In the process of reacting an arylamine of the benzene series with an alpha naphthylamine-sulphonic acid to produce an arylamino-naphthalene sulphonic acid, the improvement which comprises effecting the reaction in a closed vessel at a temperature between 150 and 175° C. and under an absolute pressure of between 5 and 20 inches of mercury.

3. The process which comprises heating an α-naphthylamine-sulphonic acid with a arylamine of the benzene series in a closed vessel at a temperature between 150 and 175° C., and under a vacuum sufficient to keep the reaction mass boiling, and then recovering the arylamino-naphthalene sulphonic acid formed.

4. The process of preparing an α-arylamino-naphthalene-sulphonic acid containing at least one arylamino group of the benzene series, which comprises heating a mixture of an arylamine of the benzene series and an α-naphthylamine sulphonic acid containing not over three sulphonic acid groups, in a closed vessel at a temperature between 150 and 175° C., while maintaining within the vessel an absolute pressure of between 5 and 15 inches of mercury.

5. A process as in claim 4, the arylamine of the benzene series being present in stoichiometrical excess, to dilute the reaction mass.

6. A process for preparing N-phenyl-peri acid, which comprises heating together in a closed vessel 1-naphthylamine-8-sulphonic acid and an excess of aniline, at a temperature of about 150 to about 155° C., while maintaining within the vessel a vacuum sufficient to keep the mass constantly boiling, continuing the reaction for about 15 to about 18 hours, and then recovering the phenyl-peri acid.

7. A process for preparing N-p-phenetyl-peri acid, which comprises heating together in a closed vessel 1-naphthylamine-8-sulphonic acid and an excess of p-phenetidine, at a temperature of about 150 to about 155° C., while maintaining within the vessel a vacuum sufficient to keep the mass constantly boiling, continuing the reaction for about 6 to about 18 hours, and then recovering the phenetyl-peri acid.

OTTO ALLEMANN.